(12) United States Patent
Chen

(10) Patent No.: US 8,253,088 B2
(45) Date of Patent: Aug. 28, 2012

(54) HEAT-DISTRIBUTION SENSOR AND SOLAR TRACKER HAVING SAME

(75) Inventor: Hsiang-Hung Chen, Taipei-Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 530 days.

(21) Appl. No.: 12/537,364

(22) Filed: Aug. 7, 2009

(65) Prior Publication Data

US 2010/0319679 A1    Dec. 23, 2010

(30) Foreign Application Priority Data

Jun. 18, 2009  (CN) .......................... 2009 1 0303403

(51) Int. Cl.
G01J 1/20 (2006.01)
(52) U.S. Cl. ..................... 250/203.4; 126/573; 126/574; 136/208
(58) Field of Classification Search ............... 250/203.4; 126/573, 574; 136/208; 356/236; 374/32
See application file for complete search history.

(56) References Cited

U.S. PATENT DOCUMENTS

| | | | | |
|---|---|---|---|---|
| 3,209,190 A * | 9/1965 | Cade | ............................... | 313/538 |
| 4,223,174 A * | 9/1980 | Moeller | ......................... | 136/246 |
| 4,253,764 A * | 3/1981 | Morrill | ........................... | 356/225 |
| 4,384,793 A * | 5/1983 | O'Brien | ........................ | 374/115 |
| 4,389,533 A * | 6/1983 | Ames | ............................ | 136/248 |
| 4,442,348 A * | 4/1984 | Snyder | ....................... | 250/203.4 |
| 4,477,145 A * | 10/1984 | Mori | ............................. | 126/573 |
| 4,491,727 A * | 1/1985 | Appelbaum et al. | ........... | 356/222 |
| 4,537,180 A * | 8/1985 | Minor | ............................. | 126/640 |
| 6,490,801 B1 * | 12/2002 | Hersom et al. | ................... | 33/268 |

* cited by examiner

*Primary Examiner* — Georgia Y Epps
*Assistant Examiner* — Kevin Wyatt
(74) *Attorney, Agent, or Firm* — Altis Law Group, Inc.

(57) ABSTRACT

An exemplary heat-distribution sensor includes a base and a number of thermocouples. The base includes a spherical surface and defines a number of receiving holes in the spherical surface. Each thermocouple has a sensing end which is received in a corresponding receiving hole and is configured for sensing heat generated by sunlight rays impinging on the sensing end.

17 Claims, 2 Drawing Sheets

HEAT-DISTRIBUTION SENSOR AND SOLAR TRACKER HAVING SAME

BACKGROUND

1. Technical Field

The present disclosure relates to solar equipment and, particularly, to a heat-distribution sensor and a solar tracker having the heat-distribution sensor.

2. Description of Related Art

Generally, solar panels work best when facing directly toward the sun. However, the position of the sun varies both with the seasons and times of day. Therefore, solar trackers are employed to track the sun and, if enabled, to orient the solar panels towards the sun. So far, many kinds of solar trackers have been developed. For example, one kind of solar tracker is configured with predetermined moving profiles of solar panels, based upon information of a perpetual calendar and a starting location of the solar panels. As such, once the solar tracker runs the moving profiles, the solar panels can accurately keep facing the sun. However, to predetermine, store, and execute the moving profiles, the solar tracker requires a high performance modern computing device. This makes the solar tracker more expensive. In addition, the moving profiles cannot be applied to the same solar panels that may be located at other regions, since different regions have different perpetual calendars.

Therefore, it is desirable to provide means for a solar tracker to be able to overcome the above-mentioned problems.

DETAILED DESCRIPTION

Figure 1:
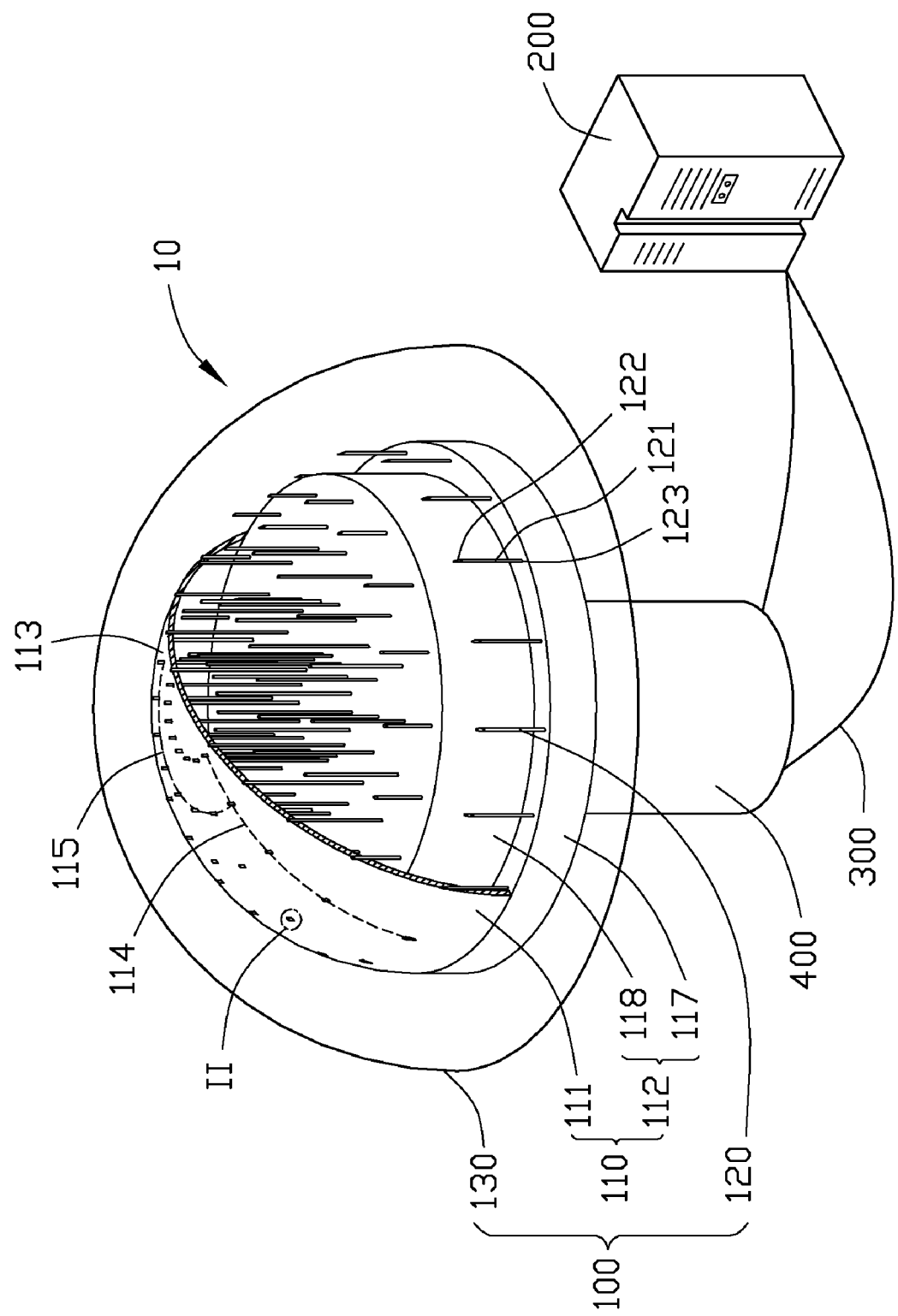
FIG. 1 is a schematic, isometric view of a solar tracker, according to an exemplary embodiment of the present disclosure.

Referring to FIG. 1, a solar tracker 10, according to an exemplary embodiment of the present disclosure, includes a heat-distribution sensor 100 and a processor 200.

The heat-distribution sensor 100 includes an opaque, thermally isolative base 110 and a number of thermocouples 120. To provide excellent opaque and thermally isolative properties, the base 110 is beneficially made from an opaque and thermally isolative material such as foam.

The base 110 includes a spherical shell 111 and an assembling platform 112.

Figure 2:
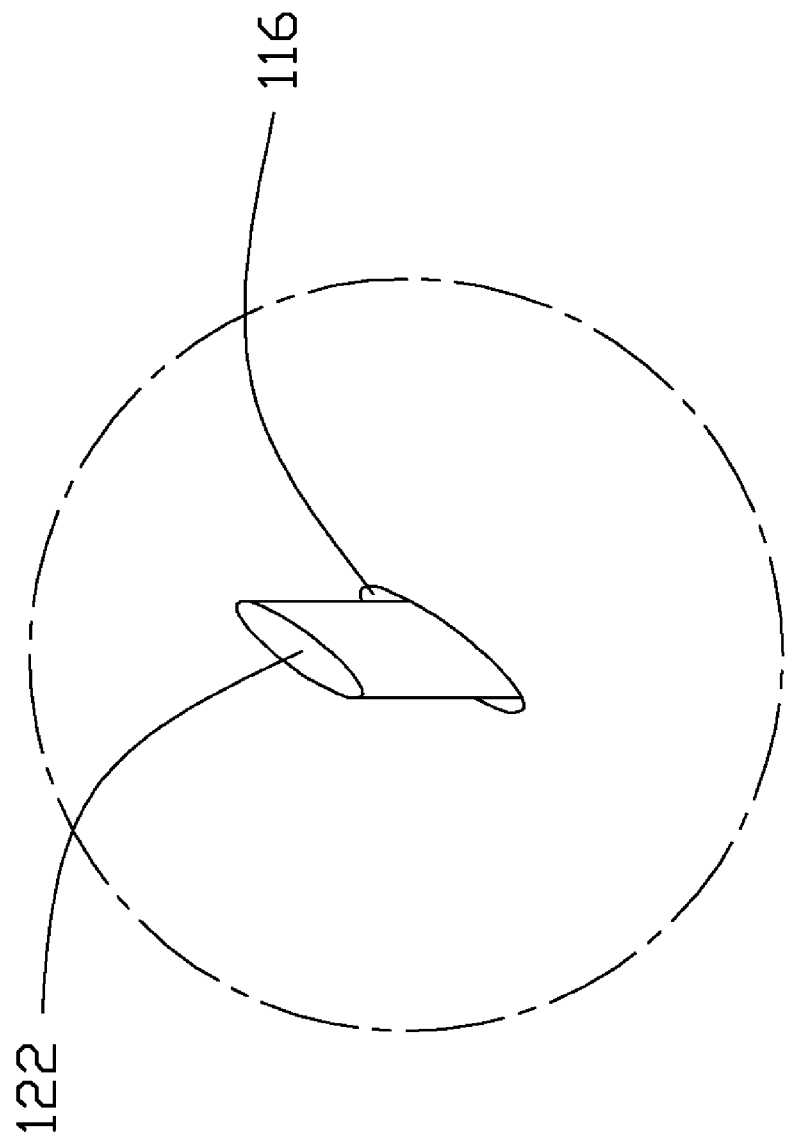
FIG. 2 is an enlarged view of a circled portion II of FIG. 1.

Also referring to FIG. 2, in this embodiment, the spherical shell 111 is hemispherical; i.e., the height of the spherical shell 111 is substantially equal to half the diameter of the spherical shell 111. However, the spherical shell 111 is not limited to this embodiment. Other spherical shells 111 having, e.g., a height slightly less than or greater than half the diameter can be employed instead. The spherical shell 111 includes an outer surface 113. In addition, the spherical shell 111 defines a number of parallels of latitude 114 and a number of half-meridians of longitude 115 (examples of both are shown with dashed lines in FIG. 1). Further, the spherical shell 111 defines a number of receiving holes 116. Each of the receiving holes 116 is located at an intersection of a corresponding parallel of latitude 114 and a corresponding half-meridian of longitude 115.

The assembling platform 112 includes a bottom disk 117 and an upper disk 118. The diameter of the bottom disk 117 is substantially similar to a diameter of a circular opening (not labeled) at a bottom of the spherical shell 111. The diameter of the upper disk 118 is smaller than that of the bottom disk 117. The upper disk 118 is coaxially disposed on the bottom disk 117. The spherical shell 111 covers the upper disk 118 and is sealed by the bottom disk 117.

Each thermocouple 120 includes a wire-shaped body 121, a sensing end 122 and a constant-temperature end 123. The constant-temperature end 123 serves as a reference point for the thermocouple 120.

Assembly of the heat-distribution sensor 100 typically includes the following steps. The thermocouples 120 are perpendicularly attached to the assembling platform 112, and are thus directed toward positions corresponding to the receiving holes 116 once the heat-distribution sensor 100 is fully assembled. In detail, the constant-temperature ends 123 are embedded into the assembling platform 112. That is, the constant-temperature ends 123 of most of the thermocouples 120 are embedded into the upper disk 118, while the constant-temperature ends 123 of some of the thermocouples 120 at a periphery of the assembling platform 112 are embedded into a portion of the bottom disk 117 not covered by the upper disk 118. The wire-shaped bodies 121 extend toward the positions corresponding to the receiving holes 116 once the heat-distribution sensor 100 is fully assembled. The spherical shell 111 is then engaged on the bottom disk 117. The sensing ends 122 protrude through the receiving holes 116 correspondingly, with extremities of the sensing ends 122 exposed to the ambient environment outside of the spherical shell 111.

It should be mentioned that assembly of the heat-distribution sensor 100 is not limited to the steps of the above-described embodiment. For example, in other alternative embodiments, the heat-distribution sensor 120 can be assembled by firstly attaching the sensing ends 122 into the receiving holes 116 correspondingly. Then the constant-temperature ends 123 are embedded into the assembling platform 112. Finally, the spherical shell 111 is engaged with the bottom disk 117.

In operation of the solar tracker 10, each thermocouple 120 can sense heat generated by sunlight rays impinging on the corresponding sensing end 122 and produce a corresponding electrical signal (e.g., an electromotive force). In other words, the heat-distribution sensor 100 can sense a heat-distribution of the sunlight rays on the outer surface 113 and produce corresponding electrical signals. In addition, since the base 110 is opaque, light rays cannot transmit therein or therethrough. Therefore, the base 110 can prevent the sunlight rays transmitting from one sensing end 122 to other sensing ends 122. Moreover, the base 110 is thermally isolative. As such, heat cannot transmit from one thermocouple 120 to another thermocouple 120 through the base 110. Therefore, unwanted extraneous heating of the thermocouples 120 is prevented. Accordingly, the sensing performed by the thermocouples 120 can be highly accurate.

In the present embodiment, the constant-temperature ends 123 are fixed in positions corresponding to the positions of the receiving holes 116. The wire-shaped bodies 121 extend perpendicular to the assembling platform 112. As such, each of the wire-shaped bodies 121 reaches the corresponding receiving hole 116 by the shortest possible route, thereby saving on the material required for the wire-shaped body 121. In addition, the assembling platform 112 having both the bottom disk 117 and the upper disk 118 also can save on the material required for all the wire-shaped bodies 121. In alternative embodiments, there may be one or more disks additional to the bottom disk 117 and the upper disk 118. All three or more such disks are stacked one on the other (e.g., coaxially) to form a stepped stack. The stepped stack also can save on the material required for all the wire-shaped bodies 121.

In the present embodiment, in addition to the base 110 and the thermocouples 120, the heat-distribution sensor 100 also includes a transparent cover 130. The transparent cover 130 covers the base 110 and the sensing ends 122 of the thermocouples 120. As such, the sensing ends 122 are shielded from interfering thermal influences such as nearby ambient airflows when the heat-distribution sensor 100 is installed outdoors. In this embodiment, the transparent cover 130 is a generally hemispherical shell, and is shaped corresponding to the shape of the spherical shell 111. In addition, to at least reduce distortion of light and heat distribution reaching the outer surface 113, the transparent cover 130 is beneficially made of material of low refractive index, e.g., silicon dioxide ($SiO_2$). The low refractive index material controls refraction of sunlight rays transmitting through the transparent cover 130. Furthermore, the transparent cover 130 is formed as thin as practicable to avoid absorbing too much heat of the sunlight rays transmitting therethrough.

The processor 200, such as a computer, is configured for locating the sun based upon the electrical signals generated by the heat-distribution sensor 100. In detail, in one embodiment, the processor 200 reads the electrical signals from the thermocouples 120 and determines which one of the electrical signals is the strongest electrical signal (e.g., has the highest electromotive force). Then, the processor 200 accordingly determines that the thermocouple 120 corresponding to the strongest electrical signal is the one that is nearest to the sun.

It will be understood that the distribution of the receiving holes 116 of the present embodiment can simplify the algorithm or algorithms employed by the processor 200. However, the distribution of the receiving holes 116 is not limited to that of the present embodiment. For example, in other alternative embodiments, the receiving holes 116 can be evenly spaced apart from each other across the entire outer surface 113.

In the present embodiment, the solar tracker 10 also includes a number of wires 300 and a wire receiver 400. The heat-distribution sensor 100 is electrically connected to the processor 200 via the wires 300. The wires 300 are received by the wire receiver 400.

While various exemplary and preferred embodiments have been described, it is to be understood that the invention is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A heat-distribution sensor comprising:
a base comprising a spherical surface and defining a plurality of receiving holes in the spherical surface; and
a plurality of thermocouples, each of which comprises a sensing end received in a corresponding receiving hole but with an extremity thereof protruding outside the spherical surface, and each of which is configured for sensing heat generated by sunlight rays impinging on the sensing end.

2. The heat-distribution sensor of claim 1, wherein the base is made from an opaque, thermally isolative material.

3. The heat-distribution sensor of claim 2, wherein the base is made from foam.

4. The heat-distribution sensor of claim 1, wherein the base comprises a spherical shell and an assembling platform positioned under the spherical shell, and the spherical shell comprises the spherical surface.

5. The heat-distribution sensor of claim 1, wherein the height of the spherical shell is substantially equal to half the diameter thereof.

6. The heat-distribution sensor of claim 2, wherein the base comprises an assembling platform, and bottoms of the thermocouples are attached to the assembling platform.

7. The heat-distribution sensor of claim 6, wherein each thermocouple further comprises a wire-shaped body and a bottom constant-temperature end, the constant-temperature end being embedded in the assembling platform, and the wire-shaped body extending toward the corresponding receiving hole.

8. The heat-distribution sensor of claim 7, wherein the constant-temperature end is embedded in the assembling platform in a position corresponding to the position of the respective receiving hole, and the wire-shaped body extends perpendicularly from the assembling platform.

9. The heat-distribution sensor of claim 4, wherein the assembling platform comprises a bottom disk and an upper disk, the upper disk being disposed on the bottom disk, the spherical shell covering the upper disk and being sealed by the bottom disk.

10. The heat-distribution sensor of claim 1, wherein the spherical surface defines a plurality of parallels of latitude and a plurality of half-meridians of longitude, and each receiving hole is located at an intersection of a corresponding parallel of latitude and a corresponding half-meridian of longitude.

11. The heat-distribution sensor of claim 1, wherein the receiving holes are evenly spaced apart from each other on the spherical surface.

12. The heat-distribution sensor of claim 1, further comprising a transparent cover, the transparent cover covering the base and the sensing ends of the thermocouples.

13. The heat-distribution sensor of claim 12, wherein the transparent cover is made from a material of low refractive index.

14. The heat-distribution sensor of claim 13, wherein the transparent cover is made from silicon dioxide.

15. The heat-distribution sensor of claim 12, wherein the transparent cover is a spherical shell.

16. A solar tracker comprising:
a heat-distribution sensor comprising:
a base comprising a spherical surface and defining a plurality of receiving holes in the spherical surface; and
a plurality of thermocouples, each of which comprises an end received in a corresponding receiving hole but with an extremity thereof slightly protruding out of the spherical surface, and each of which is configured for sensing heat generated by sunlight rays impinging on the end and generating a corresponding electrical signal; and
a processor configured for determining a location of the sun based upon the electrical signals generated by the thermocouples.

17. The solar tracker of claim 16, further comprising a plurality of wires and a wire receiver, the heat-distribution sensor being connected to the processor via the wires, the wires being received by the wire receiver.

* * * * *